(12) United States Patent
Morgan, Jr.

(10) Patent No.: US 6,499,800 B2
(45) Date of Patent: Dec. 31, 2002

(54) SEAT POST ASSEMBLY FOR CYCLES

(75) Inventor: Thomas A. Morgan, Jr., Valencia, CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/835,438

(22) Filed: Apr. 17, 2001

(65) Prior Publication Data

US 2002/0149241 A1 Oct. 17, 2002

(51) Int. Cl.[7] .................................................. B62J 1/00
(52) U.S. Cl. .............................. 297/195.1; 297/195.13; 297/215.13; 403/371; 403/375
(58) Field of Search ......................... 297/195.1, 195.13, 297/215.13; 413/371, 375

(56) References Cited

U.S. PATENT DOCUMENTS 5,324,058 A * 6/1994 Massaro ............ 297/215.13 X
5,382,039 A * 1/1995 Hawker ............. 297/215.13 X
5,517,878 A * 5/1996 Klein et al. ............. 403/371 X
5,888,214 A   3/1999 Ochoa
5,915,675 A * 6/1999 Chen .................... 297/195.1 X
6,176,640 B1 * 1/2001 Gonczi ........................ 403/375

* cited by examiner

Primary Examiner—Rodney B. White
(74) Attorney, Agent, or Firm—Lawrence E. Laubscher, Sr.

(57) ABSTRACT

A vertically adjustable seat post assembly for cycles includes a light-weight vertical seat post formed from a relatively soft high strength-to-weight material, such as a carbon fiber composition, and a relatively hard tubular protective tubular sleeve permanently secured concentrically about the lower end of the seat post. The outer diameter of the sleeve is slightly less than the inner diameter of the seat tube opening of the cycle frame, whereby the carbon fiber seat post is protected by the sleeve when the seat post is vertically adjusted and clamped within the seat tube opening.

16 Claims, 4 Drawing Sheets

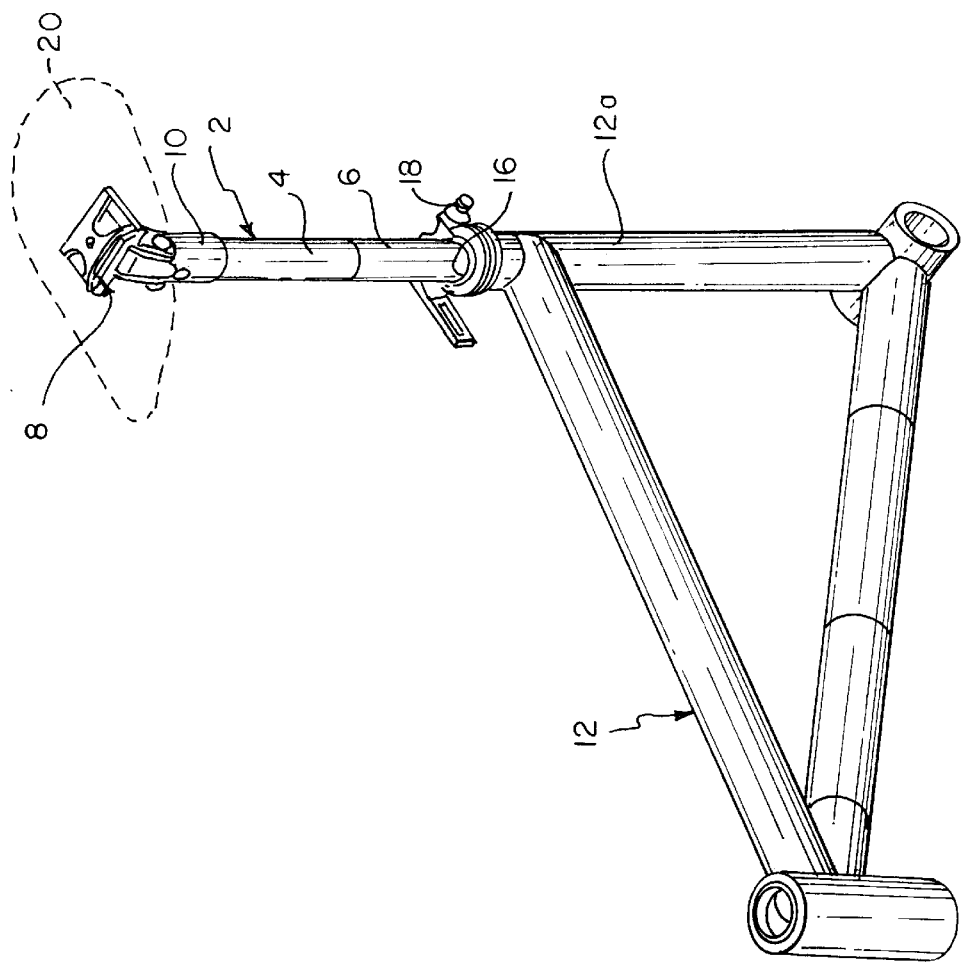
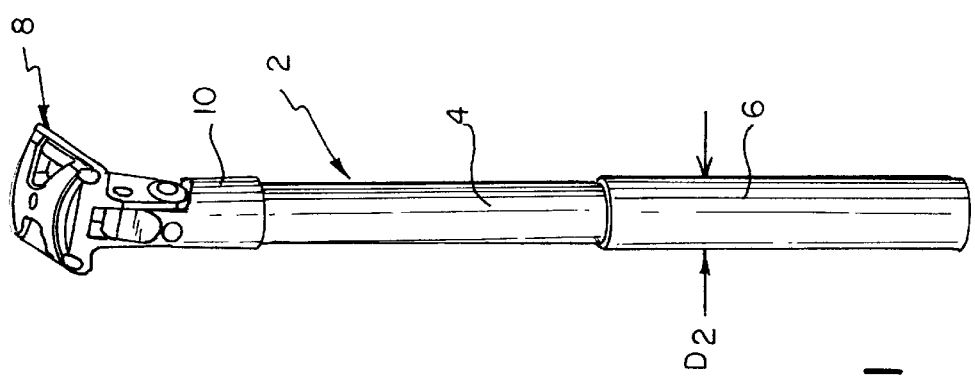

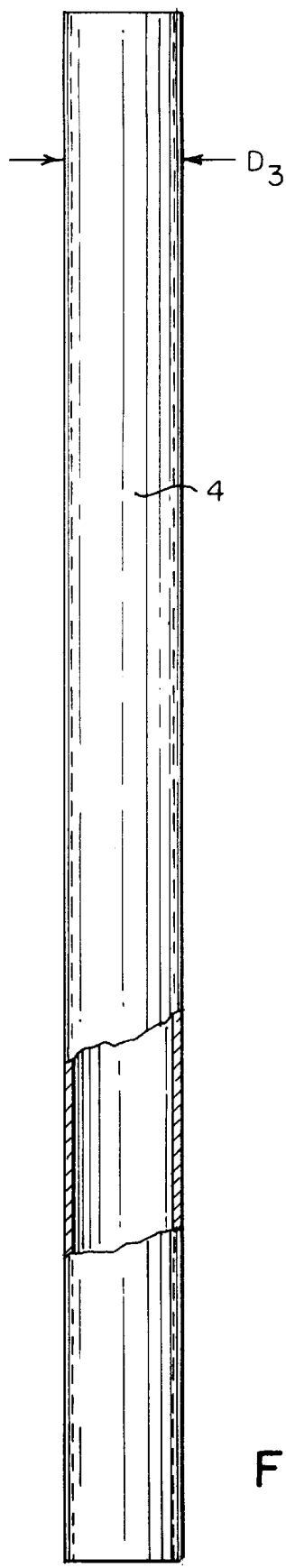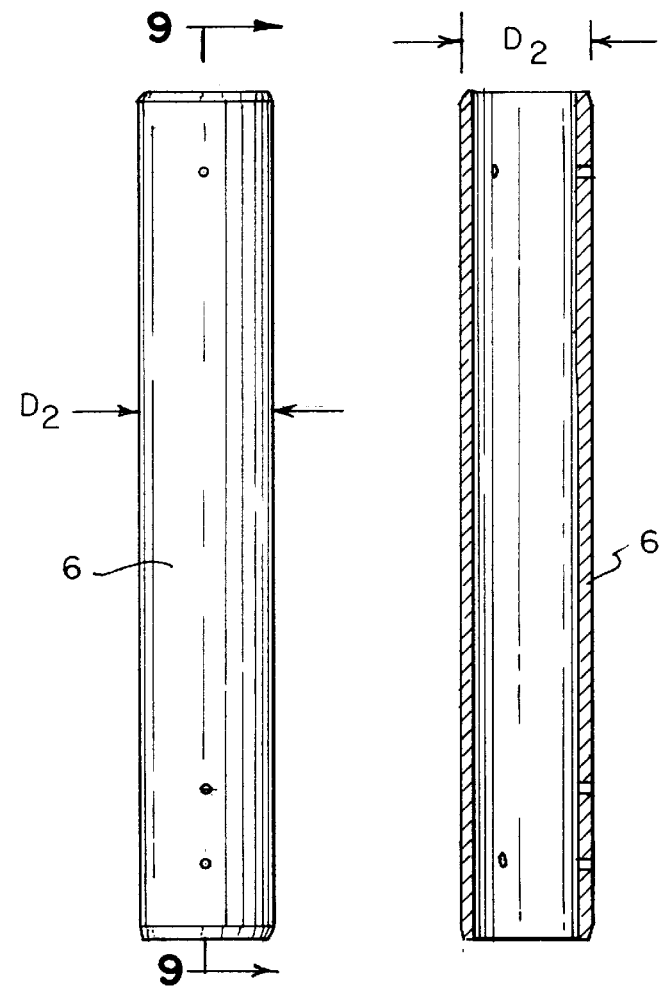
FIG. 8
FIG. 9
FIG. 7

SEAT POST ASSEMBLY FOR CYCLES

SPECIFICATION

Field of the Invention

This invention relates to a seat post assembly for cycles, including a seat post formed of carbon fiber or other relatively soft high strength-to-weight material, and a protective tubular sleeve formed of a hard metal material and arranged concentrically about the lower end of the seat post, thereby protect the seat post against damage during the vertical adjustment thereof relative to the cycle frame.

BACKGROUND OF THE INVENTION

Brief Description of the Prior Art

The use of lightweight componentry, such as a seat post, in bicycles, motorcycles, and other cycles is often seen as an opportunity to reduce the total weight in order to increase the efficiency of the cycle. However, since cycle components (i.e., a seat post) are relied upon to support the weight of the rider, the strength of the component cannot be compromised in order to reduce the weight of the part. As a result, cycle component manufacturers have used advanced materials with high strength-to-weight ratios, such as carbon fiber, titanium, magnesium, beryllium and high strength aluminum, to produce lightweight component parts. The state of design for light-weight cycles such as bicycles, though, depends upon the compatibility of the componentry to work on a wide variety of frame designs, and within various industry standards in regards to size and specification. That being the case, component manufacturers are limited in their ability to optimize the component design for the use of such advanced materials. In addition, many bicycles are assembled and serviced by untrained mechanics and consumers who might compromise the structural integrity of a component formed from advanced materials through improper installation.

Seat posts are particularly at risk of being compromised by the previously mentioned threats and limitations due to the described function of the seat post. The necessary adjustability, compatibility with various frame designs, and the fact that the seat post supports the greatest percentage of the rider's weight during travel make the use of advanced materials potentially dangerous should the seat post fail during use.

Over the years manufacturers have produced very lightweight seat posts (200 g or less for a seat post 300 mm or longer) with pillars made from carbon fiber, high strength aluminum alloys and titanium. Historically, in-the-field failures of these kinds of seat posts have been common. In addition to improper installation and abusive riding, a common cause of seat post failure has been the irregular deformation of the clamping devices used to secure seat posts into the bicycle frame. The out-of-round shape that results from the clamping device being secured can create a stress riser on the seat post at the point where it enters the bicycle frame. This is also the point of the peak bending moment during the dynamic loading of the seat post in use. As a result, the ultimate strength of the part can be greatly reduced and brought into the range of typical service loads. This affect is even more compromising in materials that are particularly notch sensitive, such as high strength aluminum and carbon fiber.

In order to counter the notch sensitivity of such materials many seat post manufactures have turned to using internal reinforcements to the seat post pillar either made from the same or different materials as the pillar or integral to the seat post pillar itself. However, if this kind of reinforcement is used over the entire length of the pillar, the weight advantage of using an advanced lightweight material may be lost; and if the reinforcement is used in only part of the pillar, there is the possibility that the rider will adjust the pillar so that a non-reinforced portion of the pillar is subject to the stress riser created by the clamping device.

Titec Cycle USA, Inc. developed a carbon fiber seat post called "the C-1 91". Originally, it was believed that a carbon fiber composite pillar could be developed that would not require reinforcement. Nonetheless, the conclusion was arrived at that a sufficiently lightweight composite tube could not be developed that had adequate hoop strength to withstand the stress riser created by the seat tube clamping device. As a result, the decision was made to install an extruded aluminum alloy on the interior of the composite pillar in order to reinforce the tube in a limited clamping area defined by a graphic on the outer diameter of the seat post pillar. This reinforcement eliminated most of field failures of the seat post, but not all. Many consumers would insert the seat post into their bicycle frame past the designated clamping area, where the post would fail under a substantial load.

Another manufacturer, Easton Sports, Inc., introduced the "CT2" carbon fiber seat post, which was integrally reinforced through the use of a variable wall thickness. This variable wall thickness design also required that a limited clamping area be defined by a graphic on the outer diameter of the seat post. However, multiple field failures drove Easton to perform multiple product redesigns, which extended the reinforced area of the seat post pillar and increased the product's weight. Additional field failures then lead to the incorporation of two flats on the cross-sectional outer diameter of the seat post. These flats provided a relief from the stress riser created when the seat tube clamping device deforms.

The Ochoa U.S. Pat. No. 5,888,214 discloses the provision of a compression device between a cycle frame and a cycle seat. A metal interacts with a compression rebound unit within a housing which is slidably inserted into the hollow cylindrical bicycle seat post mast and is secured in the mast with a set screw, thereby cushion the ride of the user.

Carbon fiber composites can be optimized by their fiber orientation to withstand substantial loads, and provide strength-to-weight ratios superior to almost any other know materials. However, that optimization is best achieved when the fiber orientation is almost entirely unidirectional. If the seat post application requires multi-directional strength characteristics, then additional layers of the carbon fiber fabric maybe required in the lay-up in order to meet the strength requirements and the weight advantage will be lost. In addition, since there is a range of seat post diameters that are considered standard, anywhere from 25.4 mm to 31.8 mm, it is difficult to optimize the lay-up for each size. It is also cost prohibitive to create tooling and to stock inventory for seat posts in each of the various standard sizes.

SUMMARY OF THE INVENTION

Accordingly, a primary object of the present invention is to provide a seat post assembly for cycles, including a seat post having a protective sleeve concentrically secured to the exterior of the lower end of the seat post, thereby to protect the seat post when inserted within the seat tube of a cycle frame. The sleeve further provides a mounting surface for the seat post within the cycle frame to regulate the height adjustment of the saddle height relative to the cycle frame to ensure a safe height adjustment. The sleeve is secured to the outer diameter of the seat post with the length of the sleeve being sufficient to accommodate the normal range of adjustment required to fit the rider to their bicycle, thereby leaving the remainder of the carbon fiber seat post exposed. The insertion of the seat post is limited by the length of the sleeve, since the outer diameter of the carbon fiber seat post is smaller than could be secured by the bicycle frame's clamping device.

By using the outer diameter of the sleeve to mate to the interior diameter of the seat tube of the frame, the carbon fiber seat post and saddle clamp assembly parts could be common in the production of seat posts in each of the twelve industry standard sizes. Only the outer diameter of the sleeve would have to be changed, and the sleeves could be easily machined from one or two extrusion sizes.

The reduced diameter necessary for the carbon fiber seat post to fit within the common interior diameter of the sleeve makes the seat post more flexible. This added flexibility, in conjunction with natural damping characteristics of the carbon fiber material, reduce the vibration and shock normally transmitted to the rider through the seat post and produce a more comfortable ride. The reduced fatigue on the rider allows him to perform at a higher level of efficiency over a longer period of time.

BRIEF DESCRIPTION OF THE DRAWINGS

Other objects and advantages of the invention will become apparent from a study of the following specification when viewed in the light of the accompanying drawings, in which:

FIG. 1 is a perspective view of the seat post, sleeve, and saddle means;

FIG. 2 is a perspective view of the assembled cycle frame, clamp means, seat post means and saddle means;

FIG. 7 is a partially sectioned elevational view of the seat post;

FIG. 8 is an elevational view of the sleeve; and

FIG. 9 is a longitudinal sectional view of the sleeve.

DETAILED DESCRIPTION

Figures 3, 4:
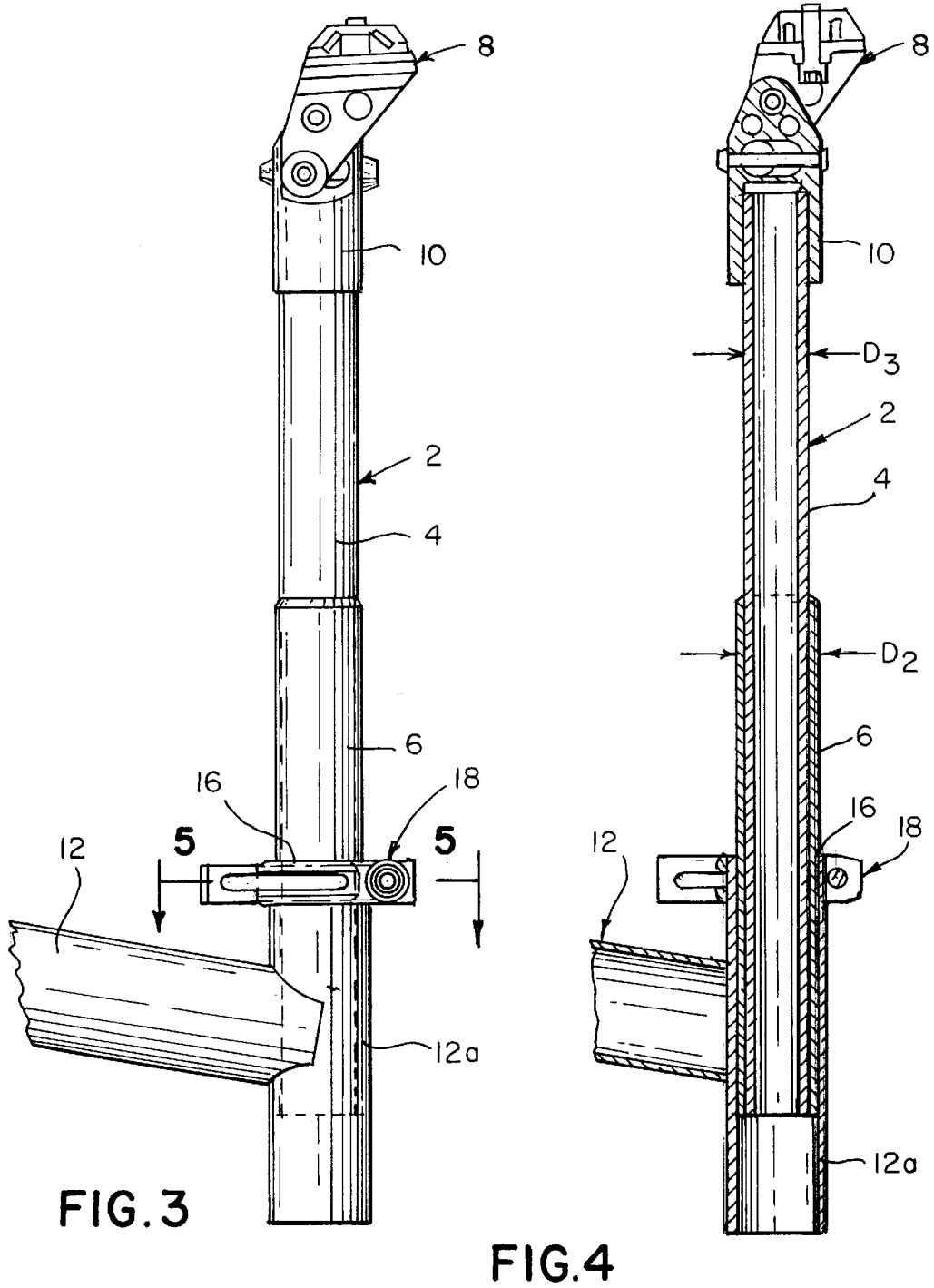
FIG. 3 is a side view of the cycle frame, clamp means, seat post means, and saddle means.
FIG. 4 is a longitudinal sectional view of the cycle frame, clamp means, seat post means, and saddle means of FIG. 3.

Referring first more particularly to FIG. 1, the seat post means 2 of the present invention includes a tubular seat post 4, and a tubular sleeve 6 mounted concentrically about the lower end of the seat post 4. At its upper end, the seat post supports seat saddle means 8 having a tubular cap portion 10 that is mounted concentrically about the upper end of the seat post 4. As will be set forth in greater detail below, the sleeve 6 and the cap portion 10 of the saddle means 8 are permanently secured (i.e., are preferably adhesively bonded) to the seat post 4.

Figure 5:
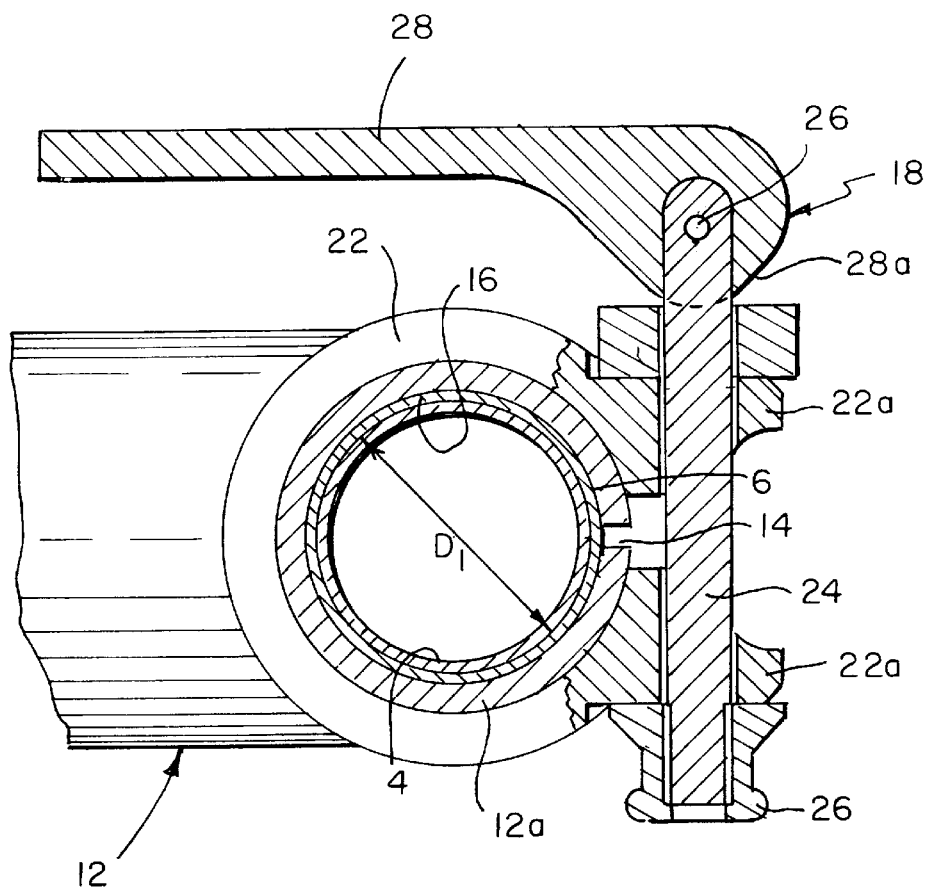
FIG. 5 is a top sectional view of the clamp means and cycle frame taken along line 5—5 of FIG. 3.

Referring now to FIG. 2, a conventional cycle frame 12 for bicycles or motorcycles includes an tubular seat tube portion 12a that contains a longitudinally extending slot 14, as best shown in FIG. 5. The opening in the upper end of the seat portion 12a has an internal diameter $D_1$ that is slightly greater than the outer diameter $D_2$ of the sleeve 6, thereby to permit insertion of the sleeve portion 6 of the seat means 2 within the seat tube opening 16, as best shown in FIG. 2. Conventional clamp means 18 are provided for compressing together the bifurcated portions of the longitudinally slit seat tube portion of the frame, thereby to clamp the seat post means 2 to the frame as is known in the art. The saddle means 8 serves to support the cycle seat 20 as shown in phantom in FIG. 2.

Referring now to FIGS. 3 and 4, it will be seen that the seat post means 2 is adapted for vertical adjustment relative to the seat tube portion 12a of the frame when the clamp means is in its released condition, as will be described below. During this vertical adjustment of the seat post means 2 relative to the seat tube portion 12a, the sleeve 6 is always opposite the clamp means 18. In accordance with an important feature of the invention, the clamp means 18 is operable to radially inwardly compress the bifurcated seat tube portion of the frame from its normal diameter $D_1$ to a reduced constricted diameter in compressed engagement with the outer circumferential surface of the sleeve 6. The diameter $D_3$ of the seat post 4 is, however, less than the constricted reduced diameter of the seat tube, whereby the seat post 4 will never be engaged by, or damaged by, the clamp means 18 and the associated bifurcated portion 12a of the frame seat tube.

Referring now to FIG. 5, the clamping means 18 includes a bifurcated clamping tube 22 having a pair of arm portions 22a that are traversed by a transverse bore that receives the clamping bolt 24. At one end, the clamping bolt 27 includes a threadably connected knob 26, and at the other end, the bolt 24 is pivotally connected by pivot 26 with a conventional operating cam lever 28. The cam lever 28 includes a cam portion 28a for displacing together the bifurcated arm portions 22a of the clamping tube 22, thereby to radially inwardly compress the seat tube portion 12a to its constricted condition of reduced diameter.

Figure 6:
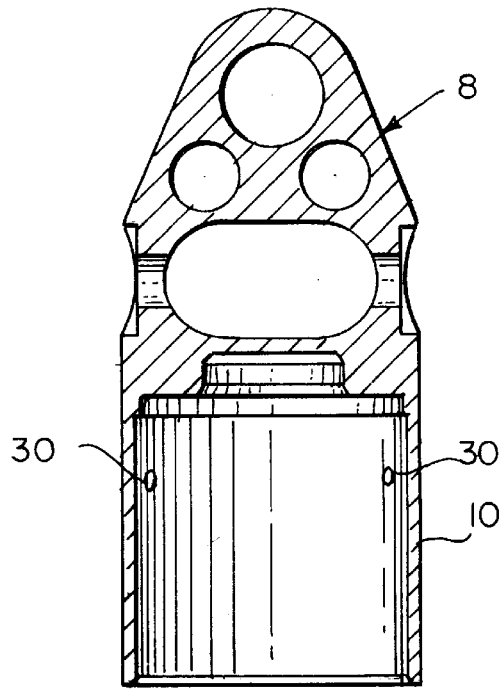
FIG. 6 is a sectional view of the cap portion of the saddle means.

As shown in FIG. 6, the lower end of the cap portion 10 of the saddle means 8 is tubular and is open at its lower end for receiving the tubular upper end of the seat post 4. The cap portion 10 contains access ports 30 for introducing adhesive in the fluid condition into the space between the interior of the cap portion 10 and the outer peripheral surface of the seat post 4.

Referring now to FIG. 7, the tubular seat post 4 is formed of a material having a high strength-to-weight ratio, such as carbon fiber, titanium, magnesium, beryllium, and high strength aluminum, thereby to afford high structural strength with a relatively low weight. Preferably, the tubular seat post 4 is formed of a carbon fiber composite material, wherein carbon fibers are bonded by an appropriate resin.

Referring now to FIGS. 8 and 9, the sleeve 6 is formed of a hard material of relatively high strength, such as a 7000 series aluminum alloy, which contains more than 3 percent, but less than 10 percent zinc. According to one embodiment of the invention, a 7075 aluminum alloy was used that contains about 2.5 percent magnesium, about 1.6 percent copper, about 0.3% chromium, and about 5.6 percent zinc. The aluminum sleeve is preferably hardened by heat treatment and furnace aging. In the illustrated embodiment, the sleeve has a length of about 170 millimeters, and the seat post has a length of about 350 millimeters. Thus, the length of the sleeve is about one-half of the length of the seat post, with the sleeve being arranged at the lower most extremity of the seat post. Thus, the upper end of the seat post has a certain degree of lateral flexibility, thereby improving the support of the seat 20 and the rider relative to the frame. Furthermore, the length of the sleeve is no less than 2.5 times the diameter of the seat post, in accordance with the requirements of the Consumer Product Safety Commission. This means that a mark must be made between 69 to 79 millimeters from the bottom of the seat post, depending on the diameter, to define the minimum insertion point of the sleeve within the opening 16 of the seat tube 12a. This effectively limits the range of height adjustment of the seat post to the remaining 91 to 101 millimeters of the sleeve.

The carbon fiber material from which the seat post is formed comprises a plurality of layers of carbon fiber fabric pre-impregnated with a binding resin, such as an epoxy resin, is commonly referred to as "pre-preg." The orientation of the fibers in each layer are optimized to achieve the strength characteristics desired in the resulting structure. The specific orientation and/or number of layers of this sort is common knowledge to those skilled in the art. This formation of layers—or "lay-up"—is then wrapped around a form—or mandrel—which is then either placed inside a mold or fed into a die. In either case, the lay-up is then heated within the mold or die to a pont at which then resin within the carbon fabric liquefies. Continued heating of the lay-up then causes the resin to harden so that the lay-up assumes a permanent form as the negative of the mold. As a whole, the process is referred to as thermoset carbon fiber molding.

While in accordance with the provisions of the Patent Statutes the preferred forms and embodiments of the invention have been illustrated and described, it will be apparent to those skilled in the art that various changes may be made in the invention without it deviating from the inventive concepts set forth above.

What is claimed is:

1. A seat post assembly for cycles, comprising:
   (a) a cycle frame having a generally vertical seat tube having an upper end portion containing an opening normally having an expanded condition having a first inner diameter ($D_1$);
   (b) seat post means, including:
      (1) a vertical elongated seat post having upper and lower ends; and
      (2) a tubular sleeve arranged concentrically about, and adhesively bonded to, the lower end of said seat post, the length of said sleeve being less than the length of said seat post, the outer diameter ($D_2$) of said sleeve being slightly less than said first diameter;
      (3) said seat post means being inserted within said seat tube with said sleeve being arranged within said seat tube upper portion; and
   (c) first clamp means for compressing said seat tube upper portion radially inwardly toward a constricted condition in clamping engagement with said sleeve, thereby to clamp said seat post within said seat tube.

2. A seat post assembly as defined in claim 1, and further including:
   (d) seat means supported by said seat post upper end, said seat means including:
      (1) a seat; and
      (2) saddle clamp means supporting said seat, said saddle clamp means including a downwardly extending tubular cap portion having an open lower end, said cap portion lower end being concentrically mounted on, and permanently secured to, said seat post upper end.

3. A seat post assembly as defined in claim 2, wherein said tubular cap portion is adhesively bonded to said seat post.

4. A seat post assembly as defined in claim 3, wherein said shim and said tubular cap portion each contain a plurality of access openings, thereby to permit the introduction of an adhesive in the fluid state into the spaces between said seat post and said tubular sleeve, and between said seat post and said tubular cap portion, respectively.

5. A seat post assembly as defined in claim 4, wherein said adhesive is a curable two-part epoxy resin.

6. A seat post assembly as defined in claim 1, wherein said seat post is tubular and contains an unobstructed through bore.

7. A seat post assembly as defined in claim 1, wherein said seat post has an outer diameter ($D_3$) that is less than the inner diameter of said seat tube when said seat tube is in said constricted condition.

8. A seat post assembly as defined in claim 7, wherein the length of said sleeve is at least 2.5 times said seat post outer diameter ($D_3$).

9. A seat post assembly as defined in claim 7, wherein said sleeve is formed from an aluminum alloy.

10. A seat post assembly as defined in claim 9, wherein said aluminum alloy comprises about 2.5% magnesium, about 1.6% copper, about 0.3% chromium, and about 5.6% zinc.

11. A seat post assembly as defined in claim 10, wherein said seat post is formed from a light-weight material selected from the group consisting of titanium, magnesium, beryllium, high strength aluminum, and a carbon fiber composite material.

12. A seat post material as defined in claim 10, wherein said seat post is formed from a carbon fiber composite material.

13. A seat post assembly as defined in claim 12, wherein the length of said sleeve is about one-half the length of said seat post.

14. A seat post assembly as defined in claim 12, wherein the length of said sleeve is at least 2.5 times said seat post outer diameter ($D_3$), and further wherein the length of said seat post is about 2 times the length of said sleeve.

15. A seat post assembly as defined in claim 14, wherein said seat post is tubular and contains an unobstructed through bore.

16. A seat post assembly as defined in claim 15, wherein said upper end of said frame seat tube portion contains a longitudinal slot.

* * * * *